US007139695B2

(12) United States Patent
Castellanos

(10) Patent No.: US 7,139,695 B2
(45) Date of Patent: Nov. 21, 2006

(54) METHOD FOR CATEGORIZING DOCUMENTS BY MULTILEVEL FEATURE SELECTION AND HIERARCHICAL CLUSTERING BASED ON PARTS OF SPEECH TAGGING

(75) Inventor: Malu Castellanos, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 10/177,892

(22) Filed: Jun. 20, 2002

(65) Prior Publication Data

US 2003/0236659 A1     Dec. 25, 2003

(51) Int. Cl.
G06F 17/28    (2006.01)
G06F 17/27    (2006.01)
G06F 17/21    (2006.01)

(52) U.S. Cl. ............... 704/4; 704/9; 704/10; 704/245; 707/101

(58) Field of Classification Search ............ 704/1–10, 704/249; 707/2, 5, 7, 101, 204, 205
See application file for complete search history.

(56) References Cited

U.S. PATENT DOCUMENTS

| | | | | |
|---|---|---|---|---|
| 5,819,258 A | * | 10/1998 | Vaithyanathan et al. | 707/2 |
| 5,857,179 A | * | 1/1999 | Vaithyanathan et al. | 707/2 |
| 6,006,221 A | * | 12/1999 | Liddy et al. | 707/5 |
| 6,460,034 B1 | * | 10/2002 | Wical | 707/5 |
| 6,513,027 B1 | * | 1/2003 | Powers et al. | 706/47 |
| 6,675,159 B1 | * | 1/2004 | Lin et al. | 707/3 |
| 6,820,075 B1 | * | 11/2004 | Shanahan et al. | 707/3 |
| 2002/0010574 A1 | * | 1/2002 | Tsourikov et al. | 704/9 |
| 2003/0084066 A1 | * | 5/2003 | Waterman et al. | 707/104.1 |
| 2003/0236659 A1 | * | 12/2003 | Castellanos | 704/4 |
| 2004/0078190 A1 | * | 4/2004 | Fass et al. | 704/7 |

OTHER PUBLICATIONS

Lee et al. Re-ranking model based on document clusters. Feb. 20, 2000. Information Processing and Management: an International Journal. pp.1-14.*

* cited by examiner

Primary Examiner—Richemond Dorvil
Assistant Examiner—Thomas E. Shortledge

(57) ABSTRACT

A method for categorizing documents is disclosed. The words composing the documents are tagged according to their parts of speech. A first group of features is selected corresponding to one of the parts of speech. The documents are grouped into clusters according to their semantic affinity to the first set of features and to each other. The clusters are refined into a hierarchy of progressively refined clusters, the features of which are selected based on corresponding parts of speech.

15 Claims, 11 Drawing Sheets

METHOD FOR CATEGORIZING DOCUMENTS BY MULTILEVEL FEATURE SELECTION AND HIERARCHICAL CLUSTERING BASED ON PARTS OF SPEECH TAGGING

FIELD OF THE INVENTION

Embodiments of the present invention relate to the field of text categorization. Specifically, embodiments of the present invention relate to a method for categorizing documents.

BACKGROUND OF THE INVENTION

The intensive growth of the World Wide Web (e.g., Web) as a widely accessible source of textually formatted data demands a way of organizing the plethora of documents available thereon into categories to simplify finding and accessing them. There have been two main methods of so organizing such Web-based text documents.

One method to organize Web-based text documents is by manual categorization. This is achieved by humans manually sifting through the documents to be organized, ascertaining their content, and so categorizing them. Manual categorization of Web-based text documents however may be problematic in certain instances.

Manual categorizing may sometimes seem laborious, tedious, time consuming, and accordingly, expensive. Further, given the high and growing speeds at which such documents are produced and other attributes of open ended Web-based text document generation, it may be difficult for humans performing this task to cope manually with the proliferation of new text documents on the Web.

Further, the results of a number of studies agree that manual document categorization may also sustain the subjectivity of human decision making in categorizing. Thus, even where the humans performing manual categorization are all experts in their fields, they may be prone to make nuanced decisions often quite different from each other. Even the same human may display nuanced differences in her/his categorization at different times due to physical and/or psychological factors such as fatigue, comfort, illness, mood, distraction, preoccupation, etc. Such subjective factors may result in categorization inconsistencies, possibly even errors and omissions.

Owing to the possible problems and impracticality of the manual system, techniques effectuating the automated categorization of Web-based text documents have become important and popular during the past decade of the growth of the Web and access thereto. Automated categorization offers improvement. Automated categorization may be applied with either pre-defined categories or unknown categories. With predefined categories, automated classification is a matter of learning a classification model for each category (e.g., class) from a labeled set of examples (e.g., training set) by use of a supervised machine learning algorithm. However, this automated technique is limited to such pre-defined categories, which may not always be practicable for full classification.

Beside needing to know the categories beforehand, automated categorization with pre-defined categories may be problematic because the training set needs to be created by labeling examples. The training set must also be sufficiently exhaustive to fully reflect the degree of variety within a category, which is often impracticable and self-limiting. This may especially be impractical with rich categories, such as documents constituting technical literature.

If the training set is not sufficiently exhaustive, omissions and errors may occur. For example, when an automated classifier using this technique finds a document that does not fully reflect the possibly insufficiently determined category attributes, it may fail to classify it as a part of the category, or it may mis-categorize it entirely.

Further, the level of training required for the mechanism to see and recognize patterns (e.g., to achieve effectiveness), may render this method also somewhat laborious, lengthy, and expensive. This may become especially difficult with documents constituting technical literature, and/or other particularly rich categories.

When categories are not known beforehand, automated categorization of text documents may be more difficult than the automated technique used with predefined categories. This owes to the fact that the categories themselves must be discovered from the document collection. Thus, automated techniques applied in a milieu of unknown categories must first discover the categories by use of an unsupervised machine learning algorithm (e.g., there is no training set). Only then may they begin further classification. This is extra work.

Conventional categorizing techniques attempt to group documents using the documents' vocabulary in its entirety and applying term-goodness criteria. However, this produces somewhat flat groupings that are effectively blind to the semantics of features, resulting in sometimes relatively meaningless groupings whose semantic coherence is at best non-obvious. The attempted solution conventionally applied to this issue is dimensionality reduction.

One example is latent semantic indexing. Unfortunately however, this solution is often not satisfactory; the problem sometimes carries over. Groupings thus formed still sometimes suffer meaninglessness and lack of obvious semantic coherence. Another example is using certain phrases and not others. While some improvement in grouping meaningfulness is occasionally obtained in this way, more often the resulting groupings lack sufficient specificity.

Thus, there exist numerous problems associated with the prior art methods for automatically categorizing documents where the categories are unknown, including the generation of coherent groupings and obfuscation of contextual relationships or other semantic coherence within groupings.

SUMMARY OF THE INVENTION

A method for categorizing documents is disclosed. The words comprising the documents are tagged according to their parts of speech. A first group of features is selected corresponding to one of the parts of speech. The documents are grouped into clusters according to their semantic affinity to the first set of features and to each other. The clusters are refined into a hierarchy of progressively refined clusters, the features of which are selected based on corresponding parts of speech.

DETAILED DESCRIPTION OF THE INVENTION

In the following detailed description of embodiments of the present invention, numerous specific details are set forth in order to provide a thorough understanding of the present invention. However, it will be recognized by one skilled in the art that the present invention may be practiced without these specific details or with equivalents thereof.

For a collection of documents composed of a vocabulary, the present invention provides, in one embodiment, a method of categorizing the document collection. This is achieved by identifying a number of parts of speech constituting the vocabulary, selecting vocabulary corresponding to a given part of speech as features, transforming the documents into a multiplicity of vectors over the features, and clustering said vectors accordingly. The process is repeated recursively using a different part of speech in progressive iterations to refine the clusters. A method of categorizing documents is effectuated by a computer system, executing a program deployed in a computer readable medium having a computer readable code for causing a computer system to execute a method of classifying documents is effectuated. In one embodiment, classification of documents is achieved by a computing instrumentality, mechanism, or other effective means. Thereby, this effectuates a method of multilevel feature selection for hierarchical hybrid clustering based on parts of speech tagging.

Certain portions of the detailed descriptions of embodiments of the invention, which follow, are presented in terms of programs, systems, values, processes, networks, and methods. These programs, systems, values, processes, networks, and methods are, in one embodiment, carried out by processors and electrical components under the control of computer readable and computer executable instructions. The computer readable and computer executable instructions reside, for example, in data storage features of computers executing these programs, compilers, and processes, utilizing these values, and making application to these functions. However, the computer readable and computer executable instructions may reside in any type of computer readable medium.

Further, although specific steps are disclosed in figures herein describing the operations of processes, such steps are exemplary. That is, embodiments of the present invention are well suited to performing various other steps or variations of the steps recited in the flowcharts of the figures herein. Further, it is appreciated that the steps of these processes may be performed by software or hardware or any combination of software and hardware.

Embodiments of the present invention are discussed primarily in the context of a method and system for categorizing documents automatically.

Figure 1:
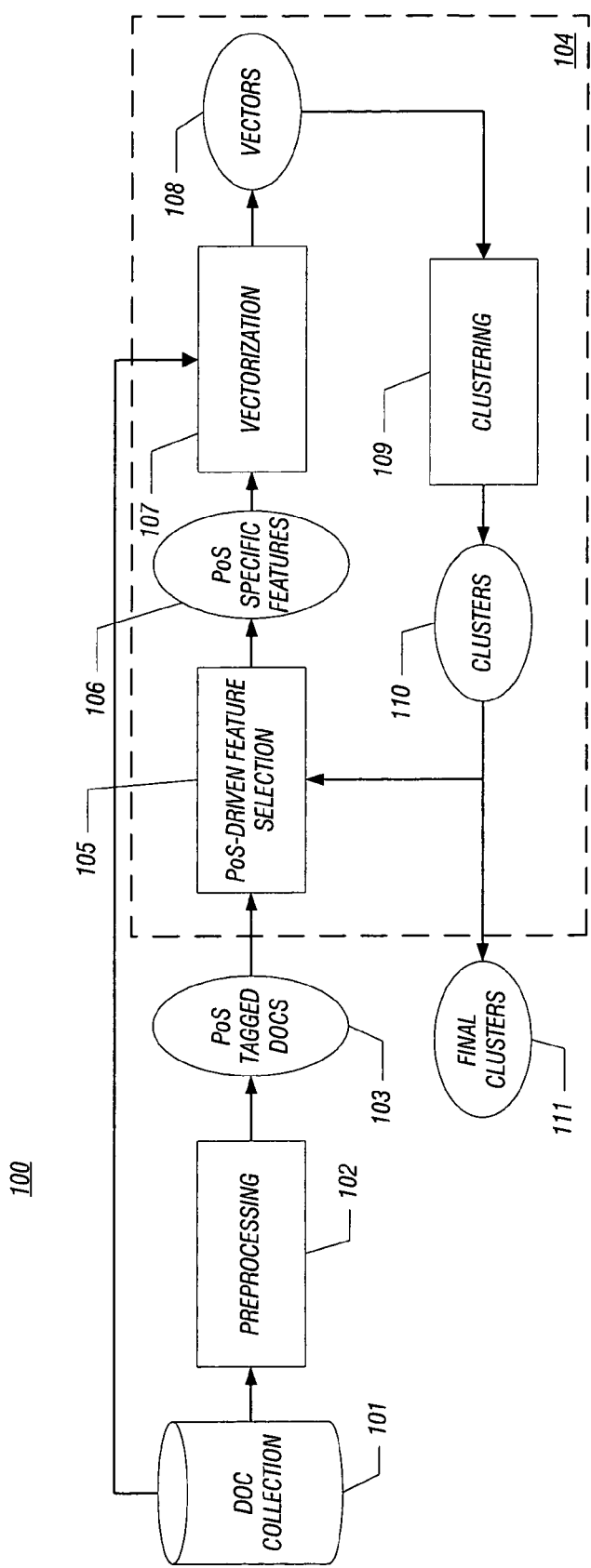
FIG. 1 is a block diagram of an automated document categorization system according to an embodiment of the present invention.

With reference to FIG. 1, an automated document categorizing system 100 is depicted, in accordance with one embodiment of the present invention. In one embodiment, automated document categorizing system 100 is a software system implemented in a computer system.

The computer system that embodies the automated document categorizing system 100 can be any kind of computer system. For example, the computer system can be a workstation computer system, a personal computer system, a main-frame computer system, or a supercomputer system. In one embodiment, the computer system is a server system.

Automated document categorizing system 100 is used to categorize the documents comprising a collection of documents.

A document collection 101 is a set of documents to be categorized. Document collection 101 is a corpus of electronically formatted documents. The documents contained therein may be Web-based documents, available on the Internet, World Wide Web, etc. The documents of document collection 101 may be WebPages, Portable Data Files (PDF), or other document formats.

The documents may be rendered in any viable format, such as HyperText Markup Language (HTML), EXtensible Markup Language (XML), and/or any other language. It is appreciated that various embodiments may classify other types of documents, and that in one embodiment, the documents of document collection 101 may be of various types and formats.

The documents of document collection 101, in one embodiment, are electronically subjected to preprocessing in a preprocessing instrumentality 102. In another embodiment, the documents of document collection 101, are clean documents, without stop words, and with the part of speech of every word already tagged accordingly. In the alternate embodiment, the documents are subjected directly to feature selection by a part of speech driven feature selection instrumentality 105.

In the present embodiment, however, preprocessing instrumentality 102 pre-treats the documents. The features of preprocessor 102 are described in FIG. 2A. Preprocessor 102 operates by a process 200, described in FIG. 2B. For brevity and clarity, the features and operation of preprocessor 102 will be discussed by simultaneous reference to FIGS. 2A and 2B, respectively.

Figure 2A:
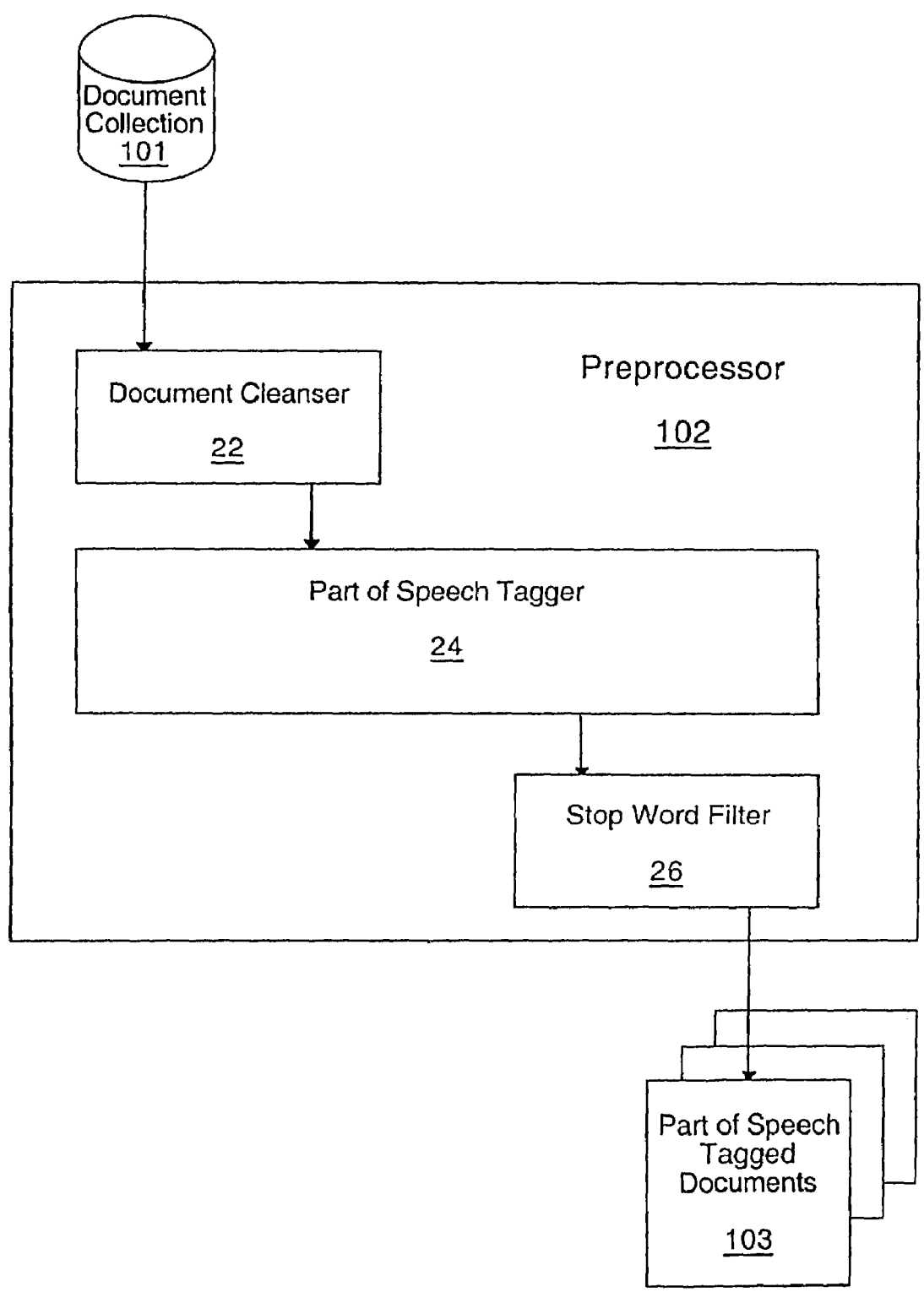
FIG. 2A is a block diagram of a preprocessor according to an embodiment of the present invention.

With reference to FIG. 2A, preprocessor 102 has a document cleansing sub-module 22 which receives documents from the document collection 101. The documents then encounter part of speech tagging sub-module 24. Next, the documents encounter stop word filter 26, which exports part of speech tagged documents 103.

Figure 2B:
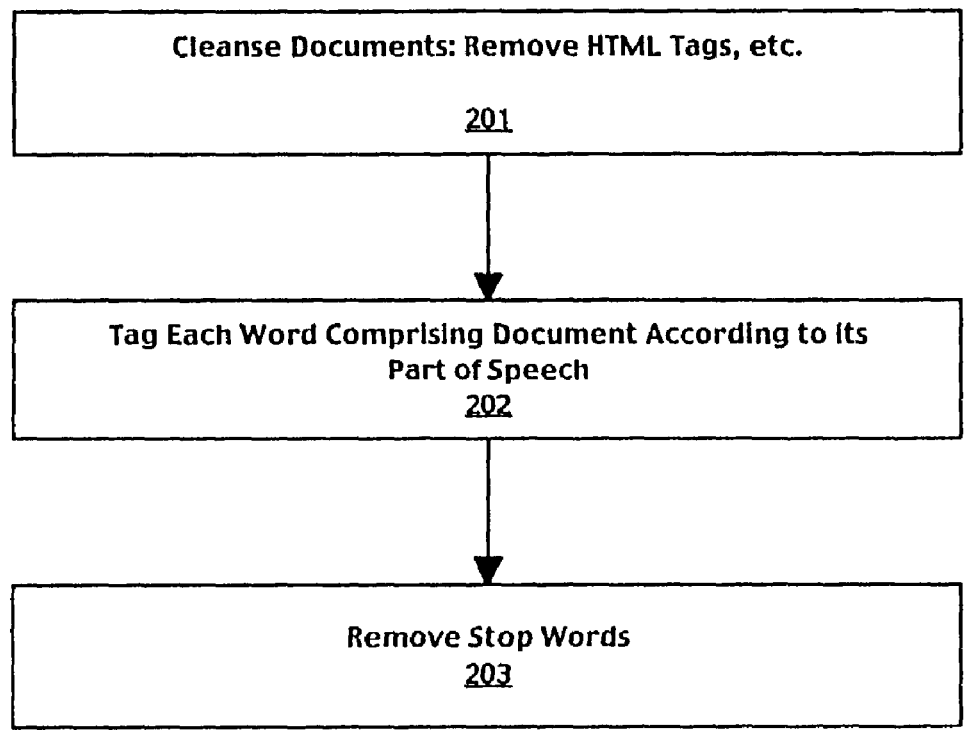
FIG. 2B is a flowchart of the operation of a preprocessor according to an embodiment of the present invention.

With reference to FIG. 2B, preprocessing has three functions, fulfilled in one embodiment by a process 200. First, In step 201, the cleanser sub-module 22 of preprocessor 102 cleanses the contents of the documents. This removes contents that may impede, corrupt, and/or prevent subsequent pre-treatment, such as part of speech (PoS) recognition, as well as subsequent treatment processes dependent thereon (e.g., PoS driven feature selection 105, discussed below).

Examples of document contents removed by the cleansing functionality 22 include, but are not limited to, HTML tags, other tags, certain headers, tables, PDF and other stamps, stationary, etc., some special symbols, and the like. It is appreciated that this list is not exhaustive, and that various document formats amenable to classification by embodiments of the present invention may have other such content. In such embodiments, the cleansing functionality 22 operates to effectuate their removal as well.

After cleansing, preprocessor 102 functions in step 202 to tag the parts of speech (PoS) characterizing the vocabulary words constituting the text of the documents from document collection 101. By part of speech tagging functionality 24, preprocessor 102 decomposes the documents into tokens. The tokens are effectively the words of the documents with attached PoS tags. These tags identify the part of speech of the tokens. For example, certain of the tokens are identified as nouns. Certain others are identified as verbs. Certain others are identified as adjectives.

It is appreciated that the tagging may be extended to identify as many different types of parts of speech as deemed necessary or desirable by a given application. For example, adverbs, prepositions, articles, conjunctions, etc. may be tagged, also. It is not necessary at this stage, in the present embodiment, to remove parts of speech that may, in the context of document classification, be considered relatively meaningless and insignificant. The PoS tagging functionality outputs one file per document, the elements of which are identified with PoS tags.

Figure 2C:
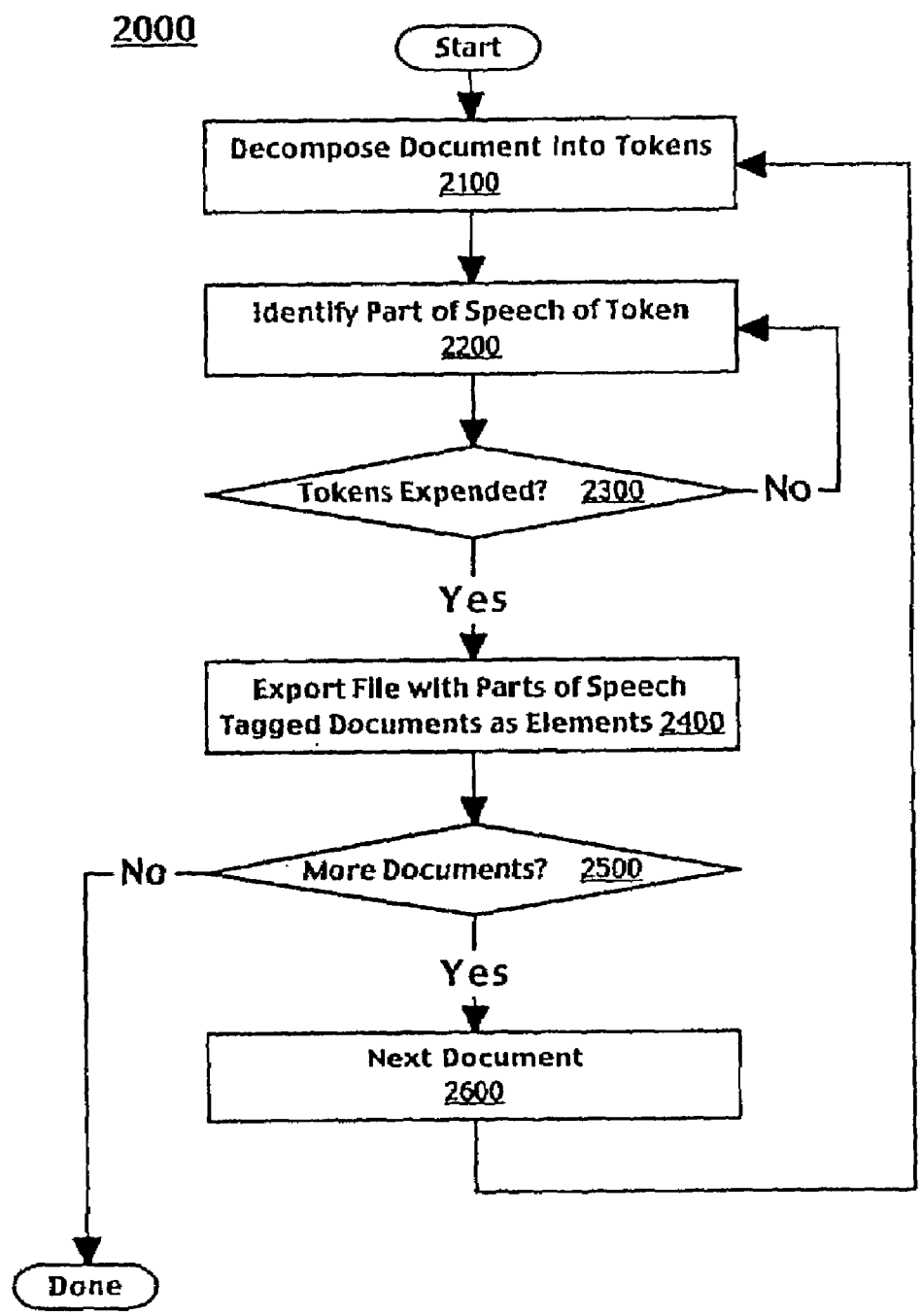
FIG. 2C is a flow chart of the steps in a preprocessing process according to an embodiment of the present invention.

Referring now to FIG. 2C, part of speech tagging, in one embodiment of the present invention, proceeds by a process 2000 described as follows. Process 2000 begins with step 2100, wherein a document is decomposed into tokens. In step 2200, the part of speech characterizing the token is identified. In step 2300, it is determined whether the tokens are expended (e.g., whether there are no further tokens from the document decomposed in step 2100 to examine). If not, process 2000 loops back to step 2200 and repeats.

If, on the other hand, it is determined in step 2300 that there are no further tokens from the document decomposed to consider, then in step 2400 a file is exported. The file contains parts of speech tagged documents as its elements. The file may be further preprocessed, such as by stop word removal, in preparation for part of speech driven feature selection. It is then determined in step 2500 whether there are further documents to examine. If not, process 2000 is complete at this point.

If, on the other hand, it is determined that there are other documents for examination, in step 2600 the next document is taken in turn. Upon proceeding to the next document, process 2000 loops back to step 2100 and begins again on the next document.

Referring to FIG. 2A, following part of speech tagging, preprocessor 102 engages a stop word removal sub-module (e.g., a stop word filter) 26. Referring to FIG. 2B, in step 203, stop word filter 26 functions to remove common irrelevant words, such as articles, prepositions, mathematica of various types, and the like. This stage eliminates words that do not convey any significantly meaningful semantics of the document contents (e.g., stop words). Upon removal of stop words, preprocessor 102 exports part of speech tagged documents 103.

The present document collection 101 is comprised of documents 1-N, wherein N is a positive whole number. Each document 1-N is comprised of any positive whole number of words. Upon tagging the parts of speech of each word, the words of each document become tokens comprised of the word and its corresponding part of speech label. Thus each document of the original document collection 101 is transformed into PoS tagged documents 103.

Referring now again to FIG. 1, system 100 now possesses cleansed parts of speech (PoS) tagged documents 103, free of stop words. These PoS tagged documents 103 are exported by preprocessor 102 into a hybrid hierarchical clustering engine 104. Hybrid hierarchical clustering engine 104 operates to perform feature selection, including representation of features as a multidimensional space, vectorization, and clustering. This operation is recursively applied to progressively refine clusters generated.

Once within hybrid hierarchical clustering engine 104, they are first exposed to PoS driven feature selector 105. Here, a method of feature selection is chosen and applied to PoS tagged documents. PoS Driven feature selector 105 operates to select features by which coherent semantic groupings of the documents of document collection 101 may be obtained. The features of PoS Driven feature selector 105 are described in FIG. 3A. PoS Driven feature selector 105 operates by a process 300, described in FIG. 3B. For brevity and clarity, the features and operation of PoS Driven feature selector 105 will be discussed by simultaneous reference to FIGS. 3A and 3B, respectively.

Figure 3A:
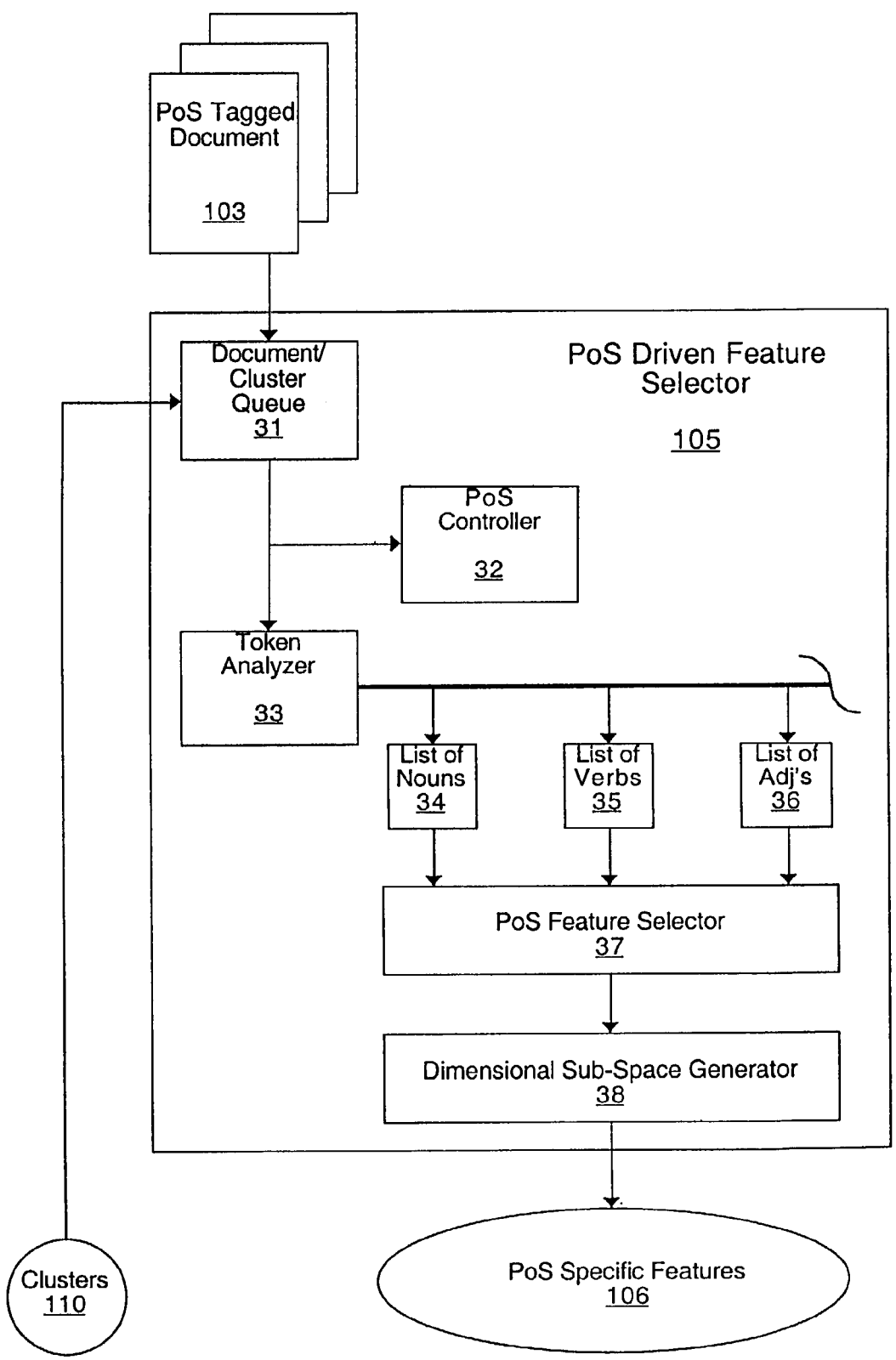
FIG. 3A is a block diagram of a part of speech driven feature selector according to an embodiment of the present invention.
Figure 3B:
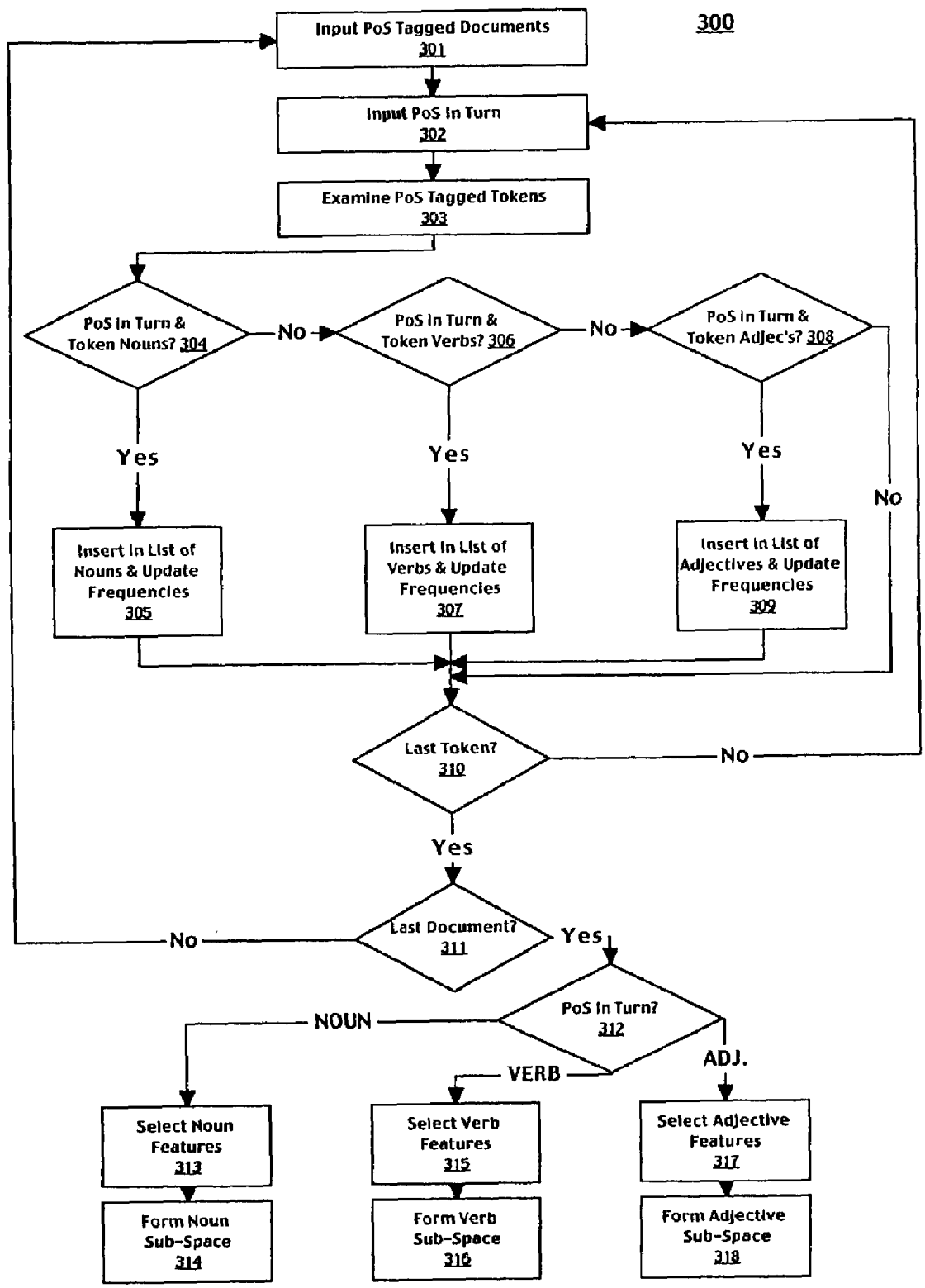
FIG. 3B is a flowchart of the operation of a part of speech driven feature selector according to an embodiment of the present invention.

Referring to FIG. 3A, PoS Driven feature selector 105 queues PoS tagged documents 103 in document queue 31, which can also receive and queue clusters 110, as described below. Referring to FIG. 3B, process 300 begins with step 301, wherein reception of PoS tagged documents 103 are queued by PoS driven feature selector 105.

PoS feature selection continues with step 302, wherein the each PoS is inputted in turn. In step 303, tagged tokens constituting each PoS tagged document are examined for parts of speech which will be of particular interest. Each part of speech tagged token in the document is examined for selection as applicable in token analyzer 33. PoS controller 32 therein keeps track of the part of speech in turn from those previously specified and sets each PoS in turn.

In step 304, if PoS controller 32 indicates that the PoS in turn is a noun and token analyzer 33 determines that a particular token is a noun, then in step 305, the token so identified is inserted into a list of nouns 34, and the frequency of occurrence, e.g., the term frequency of that noun, is updated. If not, process 300 proceeds to step 306.

In step 306, if PoS controller 32 indicates that the PoS in turn is a verb and token analyzer 33 determines that the particular token examined is a verb, then in step 307, the token so identified is inserted into a list of verbs 35, and the frequency of occurrence, e.g., the term frequency of that verb, is updated. If not, process 300 proceeds to step 308.

In step 308, if PoS controller 32 indicates that the PoS in turn is an adjective and token analyzer 33 determines that the particular token is an adjective, then in step 309, the token so identified is inserted into a list of adjectives 36, and the frequency of occurrence, e.g., the term frequency of that adjective) is updated. If not, process 300 proceeds to step 310.

In the present embodiment, nouns, verbs, and adjectives are sought by PoS controller 32, and process 300 seeks these parts of speech in this particular order. However, it is appreciated that the order by which particular parts of speech are sought by PoS controller 32 may vary in other embodiments. It is further appreciated that other parts of speech besides nouns, verbs, and adjectives, such as adverbs, prepositions, and the like, may also be sought in other embodiments. Embodiments of the present invention are well suited to such variations and alternatives.

In step 310, it is determined whether a particular token just listed and frequency-updated is the last token in a particular document. If not, process 300 loops back to step 302 and continues examining the PoS tagged tokens. If it is determined that the last token was examined and frequency-updated, process 300 proceeds to step 311. Steps 310 and 311 are performed, in one embodiment, by token analyzer 33.

In step 311, it is determined whether the tokens of the last PoS tagged document inputted to PoS Driven Feature Selector 105 have been examined. If not, process 300 loops back to step 301 and continues with the input of subsequent PoS tagged documents. If on the other hand it is determined that the PoS tagged tokens of the last document have been examined, process 300 continues in step 312 with determining which PoS is under consideration, in turn.

If nouns are the PoS under consideration, then process 300 continues in step 313 with selecting noun features, or in step 315 with selecting verb features, or in step 317 with selecting adjective features, depending on the PoS in turn indicated by the PoS controller. Selection of these PoS specific features is performed, in one embodiment, by a PoS selector 37.

Once a list of words with the parts of speech in turn is promulgated, one of the parts of speech is selected, any of a number of methods known in the art may be applied by PoS feature selector 37 to select features. Feature selector 37 can apply any of various term-goodness criteria, known in the art, and with varying selection thresholds for each, to achieve a desired degree of term elimination from a given vocabulary. Embodiments of the present invention are well suited to applying any feature selection technique. Any number of features may be selected. The features selected become the dimensions (e.g., axes) of a sub-space corresponding to the part of speech characterizing the features, e.g., the PoS selected in turn. The sub-space formed corresponding to the part of speech in turn will thus have as many dimensions as the number of features selected.

Upon selecting noun features, in step 314 a noun sub-space is formed. Upon selecting verb features, in step 316, a verb sub-space is formed. Upon selecting adjective features, in step 318, an adjective sub-space is formed. It is appreciated that step sequences 313/314, 315/316, and 317/318 are executed in the order indicated by PoS controller 32. It is further appreciated that the steps are applied recursively upon clusters, as explained below, to progressively refine the semantic groupings obtained.

The sub-spaces are formed, in one embodiment, by a PoS specific feature dimensional sub-space generator 38. Upon forming a feature subspace, process 300 is complete, and PoS specific features 106 are the output of PoS driven feature selector 105. In the present embodiment, nouns are selected first. However, it is appreciated that verbs or adjectives may be selected first in another embodiment.

As stated above, document collection 101 is comprised of documents 1-N, wherein N is a positive whole number, and each document 1-N is comprised of any positive whole number of words. Upon tagging their parts of speech, each word of each document becomes a token comprised of the word and its corresponding part of speech label, such that the original document collection 101 is transformed into PoS tagged documents 103.

Figure 3C:
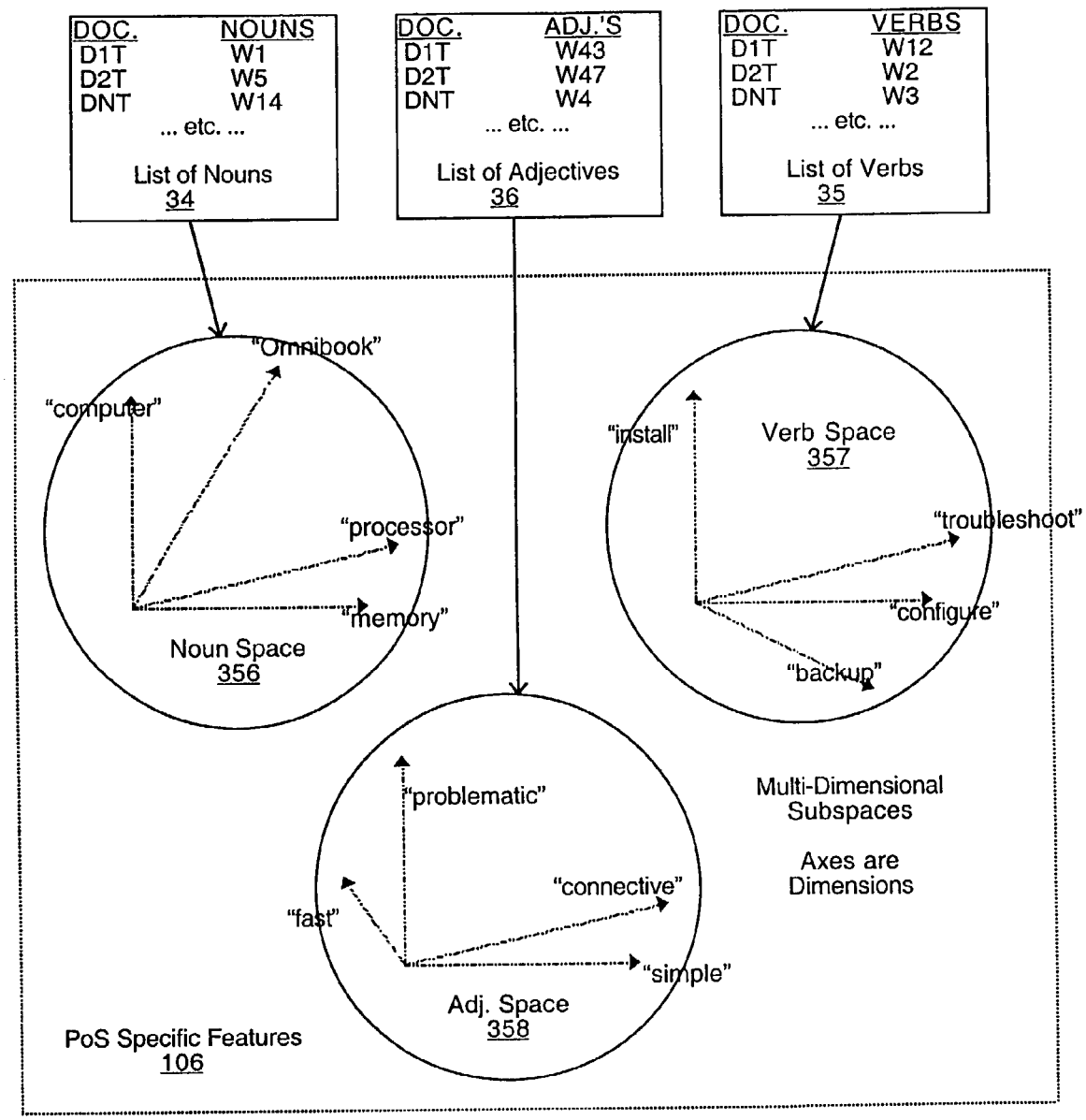
FIG. 3C depicts feature spaces generated with selected features as dimensions according to an embodiment of the present invention.

Now with reference to FIG. 3C, list of nouns 34 for example lists each word of PoS tagged documents 103, tagged as nouns. Document 1, as tagged document D1T may contain, for example 100 words, 50 of which are nouns. One of these noun words is word W1, tagged as a noun as 'W1noun'. Document 2, as tagged document D2T may contain, for example 300 words, 165 of which are nouns. One of these noun words is word W5, tagged as a noun as 'W5noun'. Document N, as tagged document DNT may contain, for example 200 words, 99 of which are nouns. One of these noun words is word W14, tagged as a noun as 'W14noun', and so on.

Similarly, list of verbs 35 lists each of PoS tagged documents 103, tagged as verbs. The 100 exemplary words of tagged document D1T contains, for example 25 verb words. One of these verb words is word W12, tagged as a verb as 'W12verb'. The 300 exemplary words of Document 2, as tagged document D2T contains 48 verb words. One of these verb words is word W2, tagged as a verb as 'W2verb'. The 200 exemplary words of Document N, as tagged document DNT contains, for example 88 verb words. One of these verb words is word W3, tagged as a verb as 'W3verb', and so on.

Similarly again, list of adjectives 36 lists each of PoS tagged documents 103, tagged as adjectives. The 100 exemplary words of tagged document D1T contains, for example 15 adjective words. One of these adjective words is word W43, tagged as a adjective as 'W43adjective'. The 300 exemplary words of Document 2, as tagged document D2T contains 24 adjective words. One of these adjective words is word W47, tagged as a adjective as 'W47adjective'. The 200 exemplary words of Document N, as tagged document DNT contains, for example 41 adjective words. One of these adjective words is word W4, tagged as a adjective as 'W4adjective', and so on.

It is appreciated that variations are possible. For example, one document may contain one or more nouns, verbs, and/or adjectives contained in another document. In another example, a certain document may lack words of a particular part of speech, or even have no words. One document may duplicate the words of another, in one example entirely; in another nearly so. Such variations are not shown in FIG. 3C for space limitations and for clarity.

The present embodiment uses nouns as the initial driving part of speech for feature selection. However, other embodiments are well suited to use any or another part of speech as the initial driving part of speech for feature selection. Still referring to FIG. 3C, four exemplary noun driven features are selected from list of nouns 34. However, it is appreciated that any number of features may be selected. Applying the applicable feature selecting technique, the four nouns are chosen for their particular semantic significance in the context of the documents at hand to be categorized. The four nouns selected as the significant features in the present example are 'computer,' 'Omnibook' (TM, a particular computer product of Hewlett Packard, Inc. of Palo Alto, Calif.), 'processor,' and 'memory.'

The features selected, in the present example the four nouns 'computer,' 'Omnibook,' 'processor,' and 'memory' form axes defining the dimensions of a noun sub-space 356. Within noun sub-space 356, semantic space is perceived from the perspective of nouns, with the four noun features selected (e.g., noun axes) delineating the dimensions. In the present example, noun sub-space 356 is four dimensional. However, noun sub-space 356 can have as many dimensions as there are noun features selected.

Similarly, a verb sub-space 357 can be formed by selecting verb features from list of verbs 35. In one example of such a verb space so formed, four verbs 'install,' 'troubleshoot,' 'backup' and 'configure' form the dimensions of verb space 357. Also similarly, an adjective sub-space 358 can be formed by selecting adjective features from list of adjectives 36. In an example of an adjective space so formed, four adjectives 'connective,' 'fast,' 'simple,' and 'problematic' form the dimensions of adjective space 358.

In the verb sub-space 357, semantic space is perceived from the perspective of verbs, with the four verb features selected (e.g., verb axes) delineating the dimensions thereof. In the adjective sub-space 358, semantic space is perceived from the perspective of adjectives, with the four adjective features selected (e.g., adjective axes) delineating the dimensions thereof. As with nouns, any number of verbs and/or adjectives can become selected features. Thus, like noun sub-space 356, verb sub-space 357 and adjective sub-space 358 can have as many dimensions as there are verb and adjective features selected, respectively.

The present embodiment forms noun sub-space 356 as an initial iteration of PoS specific features 106. Verb sub-space 357 and adjective sub-space 358 will be formed directly from the list of verbs 35 and the list of adjectives 36 promulgated by token analyzer 33, respectively, in subsequent iterations, wherein clusters are recursively subjected to progressive refinement as described below.

Referring again to FIG. 1, having selected the four features above as its dimensions, noun sub-space 356 forms the initial content of PoS specific features 106 for input to vectorizer 107.

Beginning, in the present embodiment, with noun type PoS specific features 106, vectorizer 107 operates to transform each document into a geometric point within the noun feature sub-space 356. Vectorization functionality 107, in the present embodiment, transforms the contents of each document into a vector representation over the multidimensional space given by these features. To represent semantic significance, a weight is assigned by any of several different weighting techniques known in the art. The weight assigned, in one embodiment, is a weight $w_{ij}$ that is assigned to each element of a vector to represent the importance that a word j has in a document i.

In one embodiment, term frequency-inverse document frequency (TF-IDF), a technique well known in the art, is applied to assign these weights. In this technique, the local weight TF (e.g., the frequency with which a particular term appears in a particular document undergoing vectorization), is combined with the inverse of the document frequency IDF. The global weight is given by IDF. This is the inverse of the number of documents in which the term appears. Different versions of this weighting technique may be applied in various embodiments.

In one embodiment, the weight $w_{ij}$ is given by Equation 1, below $$w_{ij}=tf_{ij}(\log 2N/n) \quad \text{Equation 1.}$$

wherein again, $w_{ij}$ is the weight of a term $T_j$ in a document $D_i$, $tf_{ij}$ is the frequency with which the term $T_j$ appears in document $D_i$, N is the total number of documents in the collection, and n is the total number of documents wherein the term $T_j$ occurs at least once. The expression N/n represents the IDF measurement component. The idea is that the more often a term appears in a document, the more important that term is, but that the more often that term appears in other documents, the less discriminating (e.g., thus less important) it is.

Figure 4A:
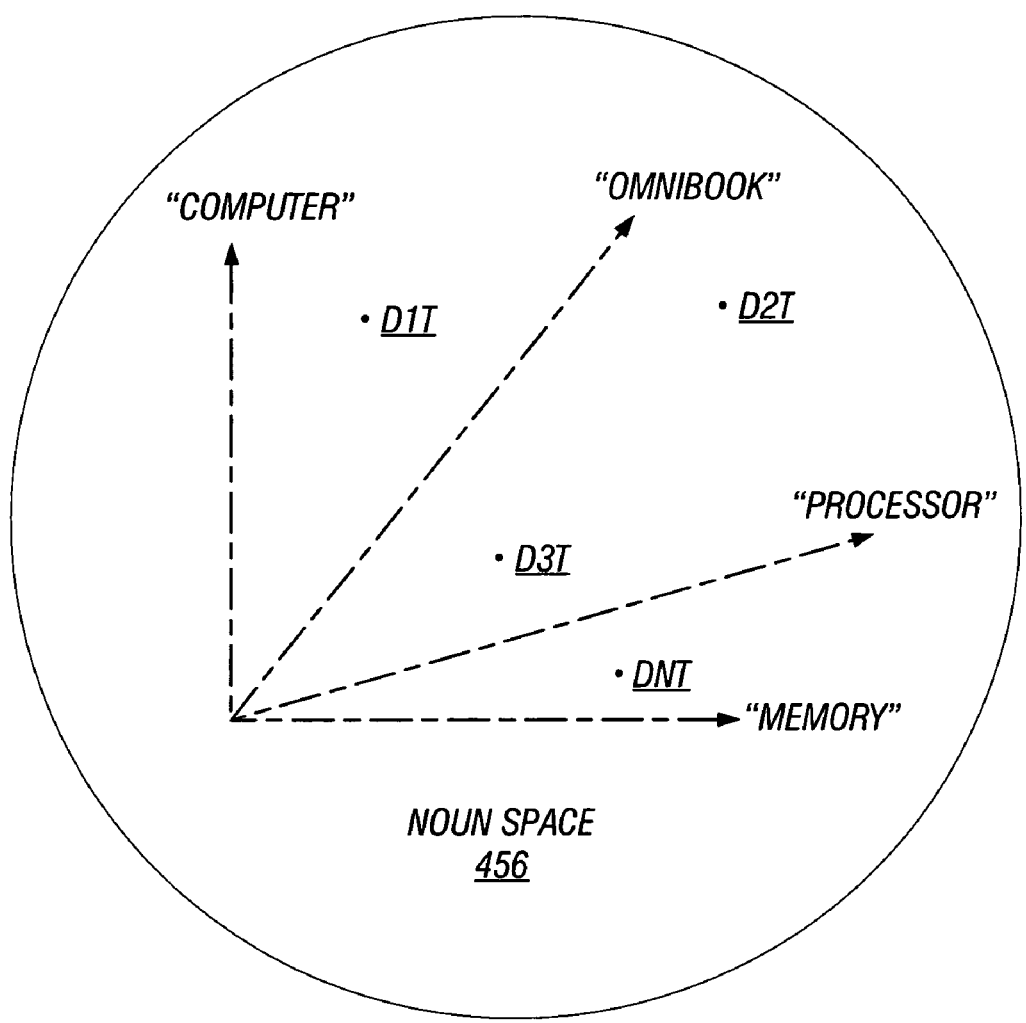
FIG. 4A depicts tagged documents populating a feature space according to an embodiment of the present invention.

Vectorizer 107 transforms the tagged documents D1T, D2T, D3T and DNT into vectors over the noun sub-space 356 (FIG. 3C). With reference to FIG. 4A, the tagged documents become individual geometric points D1T, D2T, D3T and DNT, respectively, within the noun sub-space 456 (e.g., noun sub-space 356 of FIG. 3C transformed into a point-filled space). Relative to the dimensional axes 'processor,' 'computer,' 'memory,' and 'Omnibook' and their vertex, the positioning of the documentary points D1T, D2T, D3T, and DNT indicates the degree of semantic affinity between the documents and the selected PoS specific features 106.

Figure 4B:
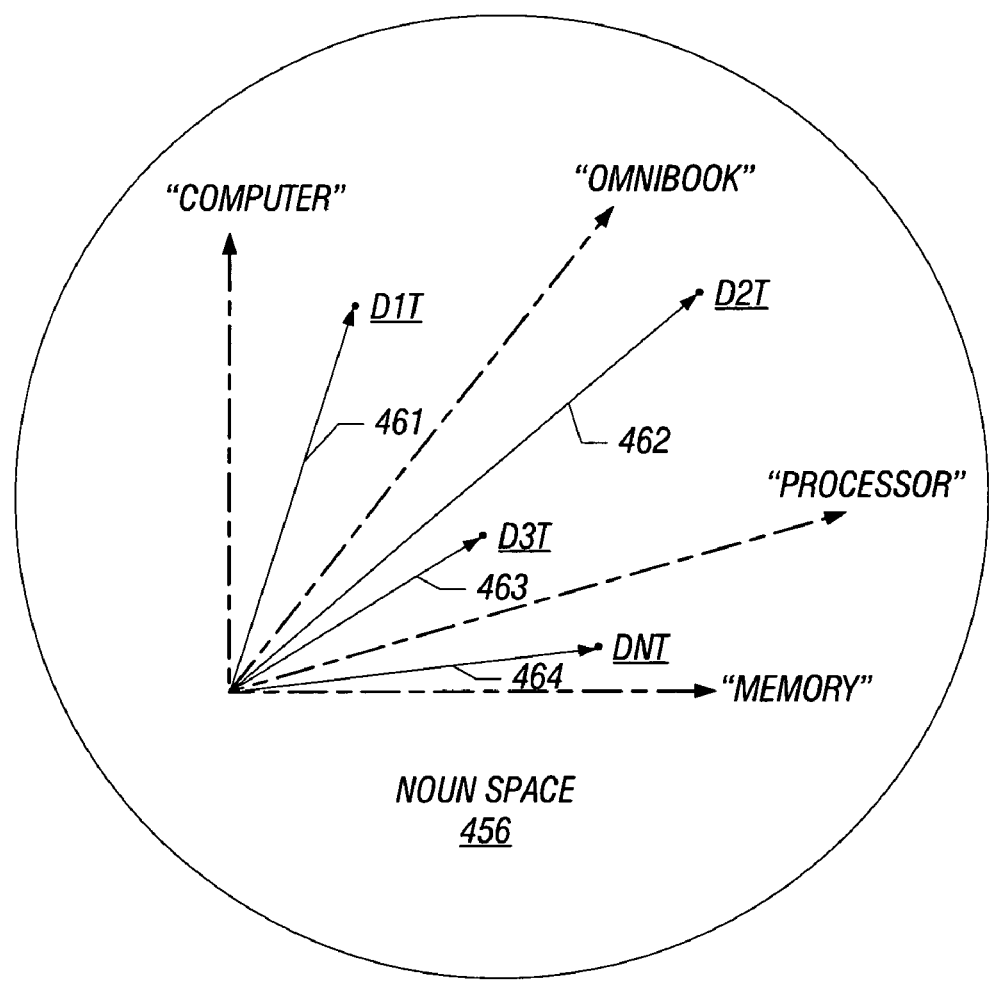
FIG. 4B depicts the transformation into vectors of tagged documents populating a feature space according to an embodiment of the present invention.

With reference to FIG. 4B, noun sub-space 456 contains four exemplary vectors displaying the magnitude and directional relationships between the documents and the PoS specific features 106 (e.g., between the documentary points and the dimensional axes) and between the documents themselves. Vector 461 displays the bearing and magnitude of this semantic affinity for point D1T. Vector 462 displays the bearing and magnitude of this semantic affinity for point D2T; vector 463 for point D3T and vector 464 for point DNT. As many vectors will be generated as there are points (e.g., tagged documents).

Again referring to FIG. 1, the output of vectorization functionality 107 is a set of vectors 108 (exemplified in FIG. 4B by vectors 461, 462, 463, and 464), into which documents have been transformed over the multidimensional space given by the semantic features selected. Vector set 108 is then inputted to a clustering functionality 109.

Clustering functionality (e.g. clusterizer) 109 clusters the information constituting the vectors, e.g., applies a clustering algorithm to them. Clusterizer 109 thus forms clusters 110 of the set of vectors 108, in which the distance between the individual vectorized points signifies the degree of semantic coherence between them.

Clustering is effectuated, in various embodiments, by any of several clustering algorithms, known in the art. The operation of clusterizer 109 is independent of any particular clustering algorithm and of the clustering coherence definition applied. Embodiments of the present invention are well suited to clusterize vectors using any effective clustering algorithm, and defining cluster coherence in any realistic way.

Clustering algorithms usable by embodiments of the present invention include, but are not limited to, K-Means, K-Median, K-Harmonic Means, and farthest point.

A K-Means algorithm exemplifies the operation of clustering functionality 109, in one embodiment of the present invention. Clusterizer 109 receives the set of vectors 108. A number K of clusters are hypothesized having the greatest possible distinction between clusters. Data objects are then moved between clusters formed to minimize variability within each cluster, and simultaneously, to maximize the distinctiveness between individual clusters.

The statistical means for each cluster are thus examined on each dimension brought into the clusterizer 109 and the distinctiveness of each cluster from each other cluster, as well as the homogeneity within each cluster, is assessed. It is determined whether sufficient homogeneity within each cluster and sufficient distinctiveness of each cluster from each other cluster exists to satisfy the original coherence definition (e.g., hypothesis) selected.

If it is determined that the homogeneity within each cluster and the distinctiveness of each cluster from each other cluster does not suffice to satisfy the original coherence definition, the clusters 110 formed thus far are recursively refined. In the present embodiment, hybrid hierarchical clustering engine 104 refines the clusters by recursively inputting them back into PoS driven feature selector 105.

PoS driven feature selector 105 receives clusters 110 for refinement and processes them in a manner similar to how the original PoS tagged documents 103 were processed.

However, now a different part of speech, for example verbs, drives the feature selection, which otherwise proceeds as described above. It is appreciated that adjectives could also be the part of speech driving the feature selection in the present stage of refining. In the present embodiment, verbs drive the feature selection for this particular stage of refinement, and adjectives for the next, if another stage of refinement is required. Hybrid hierarchical clustering engine 104 then proceeds to refine clusters in the following manner.

For each cluster, from the clusters 110 to be refined, a new set of PoS specific features 106 results from the operation of PoS driven feature selector 105 upon its documents. In the present round of refinement, PoS specific features 106 conforms the verb sub-space (e.g., verb sub-space 357; FIG. 3C) in which the documents of the corresponding cluster will be represented. Documents in that cluster are then inputted to vectorizer 107 and vectorized as to their semantic relationship to the dimensions of the verb sub-space 357. New vectors 108 are formed accordingly and become the input of the present round of refinement into clusterizer 109.

Clusterizer 109 operates on the new vectors 108 in a manner as discussed above. The statistical means for each cluster are again examined on each dimension brought into clusterizer 109 and the distinctiveness of each cluster from each other cluster, as well as the homogeneity within each cluster, is again assessed. It is again determined whether sufficient homogeneity within each cluster and sufficient distinctiveness of each cluster from each other cluster exists to satisfy the original coherence definition selected.

If it is determined that the homogeneity within each cluster and the distinctiveness of each cluster from each other cluster still does not suffice to satisfy the original coherence definition, clusters 110 formed thus far are again recursively refined. Again, hybrid hierarchical clustering engine 104 refines the clusters 110 by recursively inputting them back into PoS driven feature selector 105.

PoS driven feature selector 105 again receives clusters, now once refined clusters 110' for more refinement and processes them in a manner similar to the first refinement. However, now adjectives selected from the documents in clusters 110 to be refined, drives the feature selection, which otherwise proceeds as described above. Again, it is appreciated that if adjectives have already driven feature selection, nouns or verbs can drive feature selection at this stage of cluster refining. Hybrid hierarchical clustering engine 104 then proceeds to refine clusters in a manner as described above.

A new set of PoS Specific features 106 results from the operation of PoS driven feature selector 105 upon the once refined clusters 110 it received for a second round of refinement. In this second round of refinement, PoS Specific features 106 conforms to the adjective sub-space (e.g., adjective sub-space 358; FIG. 3C). Each cluster 110 is then inputted to vectorizer 107 and vectorized as to their semantic relationship to the dimensions of the adjective sub-space 358. New vectors 108 are formed accordingly and become the input of the second round of refinement into clusterizer 109.

Clusterizer 109 operates on the new vectors 108 by grouping them into clusters in a manner as discussed above. The distinctiveness of each cluster from each other cluster, as well as the homogeneity within each cluster, is once again assessed. It is once again determined whether sufficient homogeneity within each cluster and sufficient distinctiveness of each cluster from each other cluster exists to satisfy the original coherence definition selected.

If it is determined that the homogeneity within each cluster and the distinctiveness of each cluster from each other cluster still does not suffice to satisfy the original coherence definition, clusters 110 formed thus far can again be recursively refined in a manner as described above. A different part of speech may be used than the nouns, verbs, or adjectives used to this point or new PoS specific features using nouns, verbs and adjectives may be selected (e.g., by PoS driven feature selector 105). However, after the initial noun-driven categorization followed by the verb-driven first refinement and the adjective-driven second refinement, it is likely that no further refinement will be necessary. Recursive part of speech driven clusterizing and refinement of the clusters according to an embodiment of the present invention produces categories much more coherent than conventional techniques.

Upon determining that the homogeneity within each cluster and the distinctiveness of each cluster from each other cluster suffices to satisfy the original cluster coherence definition selected, a set of final output clusters 111 is promulgated.

Categorizing documents of document collection 101 is performed on a cluster basis, because only vectors 108 stand for analysis of PoS tagged documents 103 within a cluster, obtained on a previous level are clustered and recursively sub-clustered. This progressive refinement of clusters, in one embodiment, using different multidimensional spaces at each stage of refinement effectuates a hybrid hierarchical clustering. Advantageously, such recursive refinement achieves, in one embodiment, an extraordinary level of semantic significance, useful in categorizing the contents of document collection 101.

Figure 5:
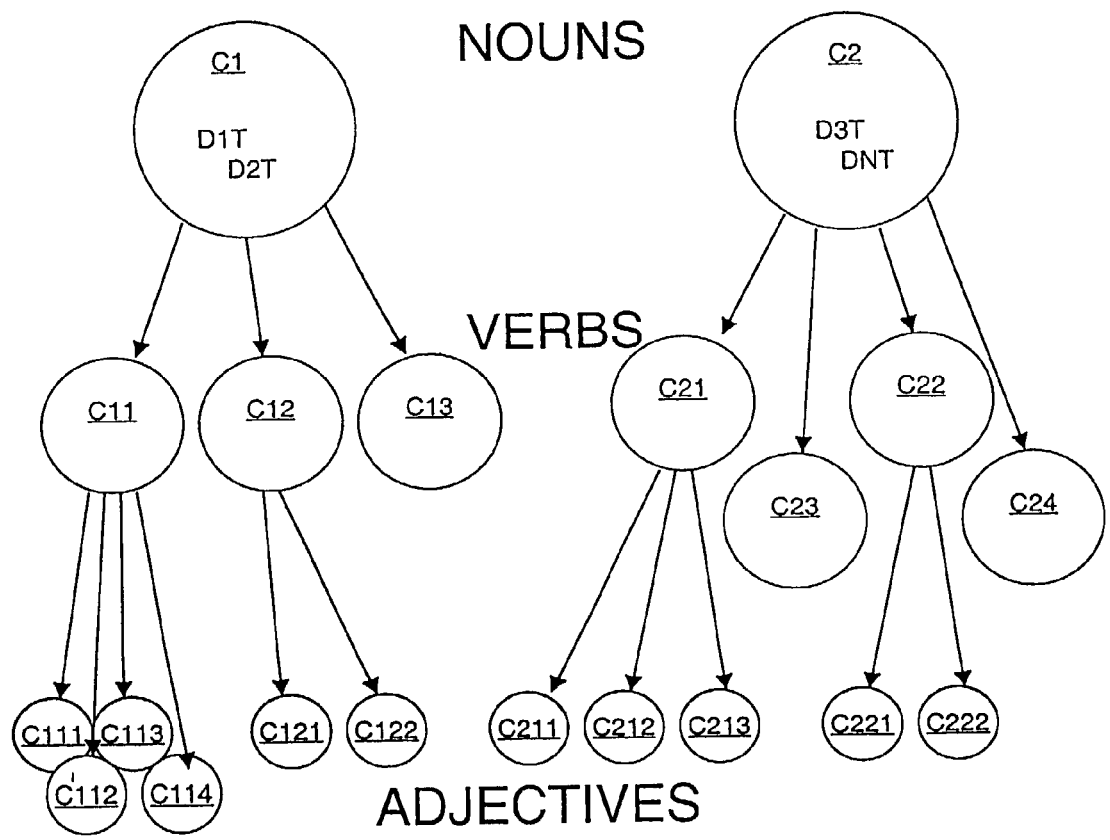
FIG. 5 depicts refinement of clusters according to an embodiment of the present invention.

FIG. 5 shows original clusters C1 and C2 formed following part of speech feature selection driven by nouns. Clusters C1 and C2 are formed by clustering vectors into which documents D1T, D2T, D3T and DNT are transformed.

Refining cluster C1 following a second feature selection iteration driven by verbs, a set of refined clusters C11, C12, and C13 are formed. Similarly, refining cluster C2 following a second feature selection iteration driven by verbs, a set of refined clusters C21, C22, C23, and C24 are formed. Refinement iterations may result in any number of refined cluster progeny from their respective parent clusters.

Refining cluster C11 following a third feature selection iteration driven by adjectives, a set of refined clusters C111, C112, C113, and C114 are formed. Similarly, refining cluster C12 following a third feature selection iteration driven by adjectives, a set of refined clusters C121, C122 are formed. Refining cluster C21 following a third feature selection iteration driven by adjectives, a set of refined clusters C211, C212, and C213 are formed. Refining cluster C22 following a third feature selection iteration driven by adjectives, a set of refined clusters C221 and C222 are formed. Further refinement of Clusters C13, C23, and C24 is not shown to preserve clarity and space limitations. However, their refinement, if necessary, would be depicted similarly, as would subsequent refinement of the adjective-driven third cluster iterations, if necessary.

Figure 6:
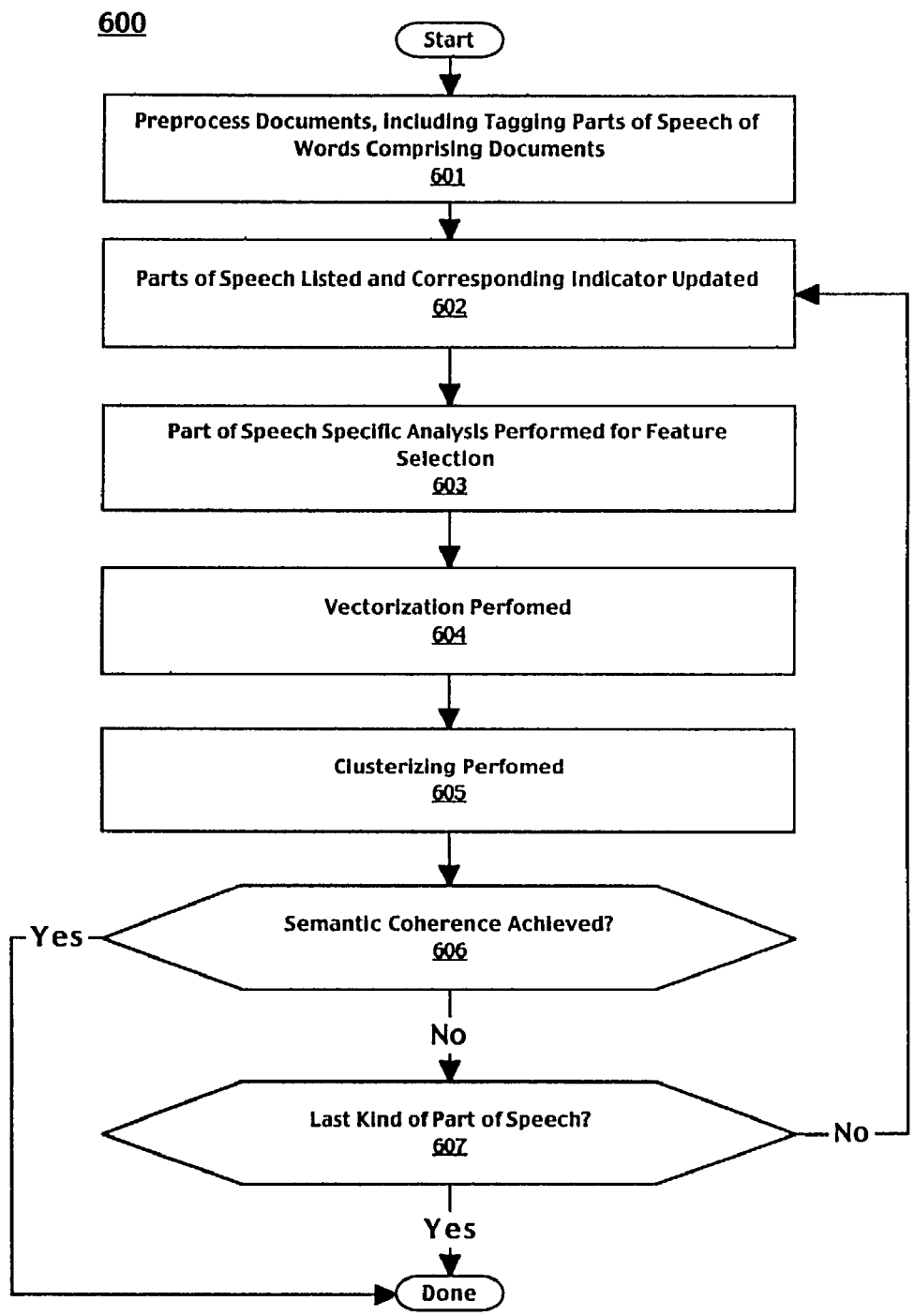
FIG. 6 is a flowchart of the steps in a process for categorizing documents, in accordance with an embodiment of the present invention.

With reference to FIG. 6, a process 600 categorizes documents according to one embodiment. Process 600 begins with step 601 wherein documents from a document collection are preprocessed. Preprocessing includes tagging the parts of speech of the words comprising the documents. Preprocessing can also include cleansing the documents and removal of stop words.

In step 602, the parts of speech are listed and a parts of speech indicator is updated. The parts of speech indicator keeps track of the parts of speech analyzed as the documents are further processed.

In step 603, processing of the documents proceeds with analysis performed for feature selection. Selection of features is driven according to the part of speech indicator. The features form dimensions of a feature space that can be populated by the documents upon further processing, wherein the documents are analyzed from the perspective of the part of speech driving the feature selection. Part of speech specific features result.

In step 604, the documents are transformed into vectors that represent them as points in the PoS specific feature space. The vector elements are the weights corresponding to the importance that the features have for the documents. Vectors representative of the assigned weights are generated.

In step 605, the vectors are analyzed according to their degree of semantic similarity or distance and corresponding clusters are promulgated. The clusters may be formed by any appropriate clustering algorithm.

In step 606, it is determined whether adequate semantic coherence has been achieved. If not, process 600 proceeds to step 607. If adequate semantic coherence is achieved, process 600 is complete.

In step 607, it is determined whether the last kind of part of speech has been analyzed. If so, process 600 is complete. If not, process 600 loops back to step 602 and recursively repeats from that point for each cluster obtained in step 605. In this way, clusters can be progressively refined to achieve a high degree of semantic coherence in the document categories so formed.

In summary, a method of categorizing a document collection by tagging the words in the document according to their parts of speech is disclosed. A group of features is selected corresponding to one of the parts of speech. A feature space is formed that corresponds to the features. In the feature space, each of the features constitutes a dimension. The documents are transformed into vectors within the feature space. The vectors are grouped into clusters. The clusters can be recursively refined.

An embodiment of the present invention, a method of categorizing documents, is thus described. While the present invention has been described in particular embodiments, it should be appreciated that the present invention should not be construed as limited by such embodiments, but rather construed according to the following claims and their equivalents.

What is claimed is:

1. A method for categorizing documents comprising:
    tagging words of said documents with tags indicating respective parts of speech of the words and producing corresponding part of speech tagged documents;
    selecting, by a feature selector, a first set of features based on the tagged words for a first one of said parts of speech;
    generating, by the feature selector, a multidimensional feature space that has plural dimensions corresponding to the first set of features;
    transforming, by a vectorizer, each of the documents into a vector and populating the feature space with each of the documents according to a degree of semantic relation between each document and the features corresponding to the dimensions of the feature space;
    grouping, by a clusterizer, said documents into clusters based on analyzing each of the vectors, wherein each of the clusters corresponds to a respective category; and
    determining, by the clusterizer, a semantic sufficiency of each of the categories; and
    in response to determining that the categories lack semantic sufficiency, refining, with the feature selector, vectorizer, and clusterizer, said clusters using at least another set of features for at least another one of said parts of speech different from the first one of the parts of speech.

2. The method as recited in claim 1 wherein said parts of speech are selected from the group consisting of nouns, verbs, and adjectives.

3. The method as recited in claim 1 wherein said refining comprises:
    selecting the at least another set of features for the at least another one of said parts of speech;
    grouping said clusters into refined clusters according to their semantic affinity to said another set of features and to each other, and
    determining a degree of semantic coherence of said refined clusters.

4. The method as recited in claim 3 further comprising further refining said refined clusters into a final set of clusters, wherein said final set of clusters comprise corresponding categories.

5. The method as recited in claim 4 wherein said further refining comprises repeating said selecting, said grouping, and said determining recursively upon said refined clusters, wherein said selecting is based on progressively subsequent parts of speech in turn.

6. The method as recited in claim 1 wherein grouping said documents into clusters uses a clustering process selected from the group consisting of K-Means, K-Median, K-Harmonic Means, and Farthest Point.

7. A computer-implemented automated system for categorizing a collection of documents, wherein each document of said collection comprises a plurality of words, comprising:
    a preprocessor for tagging words of each of the documents according to parts of speech of the words and producing corresponding part of speech tagged documents;
    a feature selector for generating a multidimensional feature space according to a first one of said parts of speech, wherein the feature space has plural dimensions corresponding to features selected from the words tagged according to the first part of speech;
    a vectorizer for transforming each said document into a vector and populating said feature space with each said document according to a degree of semantic relation between each said document and the features corresponding to the dimensions of the feature space; and
    a clusterizer for analyzing each said vector and generating a plurality of corresponding clusters, wherein each of the clusters corresponds to a respective category, and the clusterizer for determining a semantic sufficiency of each said corresponding category,
    wherein said feature selector further comprises:
    a queuing module for queuing each said document to be processed in said feature selector and queuing the clusters for refinement in said feature selector according to a part of speech selected in turn;
    a controlling module for keeping track of each said part of speech in turn;
    a token examination module for examining selectively each said document and each said cluster and identifying a corresponding part of speech thereof in turn to be processed accordingly, counting a frequency of occurrence of each said word, and promulgating a list of each said word tagged according to its part of speech and said frequency of occurrence thereof;

a feature selection module for performing semantic analysis and choosing said feature according to a predetermined criterion and generating corresponding part of speech specific features; and a space generating module for forming said feature space specific to said part of speech selected in turn and defining dimensions of said space corresponding to said features.

8. A computer-implemented automated system for categorizing a collection of documents, wherein each document of said collection comprises a plurality of words, comprising;

a preprocessor for tagging words of each of the documents according to parts of speech of the words and producing corresponding part of speech tagged documents;

a feature selector for generating a multidimensional feature space according to a first one of said parts of speech, wherein the feature space has plural dimensions corresponding to features selected from the words tagged according to the first part of speech;

a vectorizer for transforming each said document into a vector and populating said feature space with each said document according to a degree of semantic relation between each said document and the features corresponding to the dimensions of the feature space; and a clusterizer for analyzing each said vector and generating a plurality of corresponding clusters, wherein each of the clusters corresponds to a respective category, and the clusterizer for determining a semantic sufficiency of each said corresponding category, upon determining that said categories lack semantic sufficiency, said feature selector, said vectorizer, and said clusterizer operate in concert to refine said clusters based upon a subsequent said part of speech.

9. The system as recited in claim 8, wherein said preprocessor further comprises:

a document cleansing module for removing a part of each document that does not comprise a word;

a part of speech tagging module for tagging each word according to its part of speech; and a stop word removal module for filtering words having low semantic significance.

10. The system as recited in claim 8, wherein said vectorizer further assigns weights to the vectors within said feature space, wherein said weights are directly proportional to frequencies with which words appear in corresponding documents and inversely proportional to frequencies with which words appear in said collection of documents to which said document belongs.

11. The system as recited in claim 8, wherein said clusterizer categorizes said collection by grouping each said document by a clustering process selected from the group consisting of K-Means, K-Median, K-Harmonic Means, and Farthest Point.

12. A method provided by execution by a computer of instructions on a computer-readable medium, the method for categorizing a collection of documents containing words and comprising:

tagging said words according to their parts of speech to transform each said document into a corresponding part of speech tagged document;

removing stop words to transform each said part of speech tagged document into a part of speech tagged document that is free of stop words;

selecting from said part of speech tagged documents a first plurality of features corresponding to a first said part of speech;

forming a first feature space corresponding to said first plurality of features, wherein each of said first plurality of features corresponds to a dimension of the first feature space;

transforming each said document into a vector in said first feature space;

clustering said vectors in said first feature space into first level clusters;

determining a sufficiency of semantic coherence of said first level clusters; and refining said first level clusters in response to determining the semantic coherence of the first level of clusters is insufficient, wherein said refining comprises:

selecting an Nth plurality of features according to an Nth part of speech wherein said Nth part of speech is different from said first part of speech;

forming an Nth feature space corresponding to said Nth plurality of features, wherein each of said Nth plurality of features is a dimension of the Nth feature space;

transforming said first level of clusters into an Nth plurality of vectors in said Nth feature space;

clustering said Nth plurality of vectors into Nth clusters; and determining the sufficiency of semantic coherence of said Nth clusters.

13. The method as recited in claim 12 further comprising recursively repeating said selecting, said forming, said transforming, said clustering, said determining, and said refining until sufficient semantic coherence is achieved.

14. The method as recited in claim 12, wherein said clustering comprises a process selected from the group consisting of K-Means, K-Median, K-Harmonic Means, and Farthest Point.

15. A method provided by execution by a computer of instructions on a computer-readable medium, the method for categorizing a collection of documents containing words and comprising:

tagging said words according to their parts of speech to transform each said document into a corresponding part of speech tagged document;

removing stop words to transform each said part of speech tagged document into a part of speech tagged document that is free of stop words;

selecting from said part of speech tagged documents a first plurality of features corresponding to a first said part of speech;

forming a first feature space corresponding to said first plurality of features, wherein each of said first plurality of features corresponds to a dimension of the first feature space;

transforming each said document into a vector in said first feature space;

clustering said vectors in said firs feature space into first level clusters;

determining a sufficiency of semantic coherence of said first level clusters; and refining said first level clusters in response to determining the semantic coherence of the first level of clusters is insufficient, wherein said selecting further comprises:

performing semantic analysis to choose said first plurality of features according to a predetermined criterion; and assigning weights to said vectors within said feature space, wherein said weights are directly proportional to frequencies with which words appear in respective documents and inversely proportional to frequencies with which said words appear in said collection of documents to which said document belongs.

* * * * *

UNITED STATES PATENT AND TRADEMARK OFFICE
CERTIFICATE OF CORRECTION

PATENT NO. : 7,139,695 B2
APPLICATION NO. : 10/177892
DATED : November 21, 2006
INVENTOR(S) : Malu Castellanos Page 1 of 1

It is certified that error appears in the above-identified patent and that said Letters Patent is hereby corrected as shown below:

In column 14, line 18, in Claim 3, after "other" delete "," and insert -- ; --, therefor.

In column 15, line 13, in Claim 8, after "comprising" delete ";" and insert -- : --, therefor.

In column 16, line 58, in Claim 15, delete "firs" and insert -- first --, therefor.

Signed and Sealed this

Nineteenth Day of May, 2009

JOHN DOLL
*Acting Director of the United States Patent and Trademark Office*